(12) United States Patent
Goldfarb

(10) Patent No.: US 10,117,094 B2
(45) Date of Patent: *Oct. 30, 2018

(54) SYSTEMS AND METHODS FOR IDENTIFYING ROGUE BASE STATIONS

(71) Applicant: Verint Systems Ltd., Herzliya, Pituach (IL)

(72) Inventor: Eithan Goldfarb, Ness Ziona (IL)

(73) Assignee: VERINT SYSTEMS LTD., Herzilya, Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,729

(22) Filed: Sep. 6, 2017

(65) Prior Publication Data

US 2018/0070228 A1 Mar. 8, 2018

Related U.S. Application Data

(63) Continuation of application No. 13/874,332, filed on Apr. 30, 2013, now Pat. No. 9,788,196.

(30) Foreign Application Priority Data

Apr. 30, 2012 (IL) .......................................... 219500

(51) Int. Cl.
*H04W 12/02* (2009.01)
*H04W 12/12* (2009.01)
*H04L 29/06* (2006.01)

(52) U.S. Cl.
CPC ......... *H04W 12/02* (2013.01); *H04L 63/1408* (2013.01); *H04W 12/12* (2013.01)

(58) Field of Classification Search
CPC ............. H04L 63/1408; H04L 63/1433; H04L 63/1416; H04L 63/1441; H04L 63/1425;

(Continued)

(56) References Cited

U.S. PATENT DOCUMENTS 7,333,481 B1 2/2008 Rawat et al.
2005/0102517 A1 5/2005 Paddon et al.
(Continued)

FOREIGN PATENT DOCUMENTS

EP 2003818 12/2008
EP 2003818 A1 * 12/2008 ......... H04L 63/1441
WO 2010/116292 10/2010

OTHER PUBLICATIONS

3GPP TR 33.801 V1.0.0 (Nov. 2005), 3rd Generation Partnership Project; Technical Specification Group Service and System Aspects; Access Security Review (Release 7).*

(Continued)

*Primary Examiner* — George Eng
*Assistant Examiner* — Jing Gao
(74) *Attorney, Agent, or Firm* — Meunier Carlin & Curfman

(57) ABSTRACT

Methods and systems for identifying one or more rogue devices within a wireless communication network over a particular geographic location. A rogue base station detection system receives air interface transmissions from base stations belonging to a wireless communication network, as well as from one or more rogue base stations that do not belong to the network and are used for monitoring (e.g., hacking or eavesdropping) communication terminals communicating in the network. The system typically searches for signaling channels and converts the RF signal into GSM/UMTS messages including overcoming the different encryption methods used. The system than analyzes the received transmissions so as to identify suspicious transmissions that may be transmitted by the rogue base stations.

17 Claims, 2 Drawing Sheets

(58) Field of Classification Search
CPC ..... H04W 12/12; H04W 24/08; H04W 52/04; H04W 12/06; H04W 12/08; H04W 48/16; H04W 12/10

See application file for complete search history.

(56) References Cited

U.S. PATENT DOCUMENTS

| | | |
|---|---|---|
| 2006/0153153 A1 | 7/2006 | Bhagwat et al. |
| 2006/0164199 A1 | 7/2006 | Gilde et al. |
| 2011/0086614 A1* | 4/2011 | Brisebois .......... H04K 3/42 455/411 |
| 2011/0151796 A1 | 6/2011 | Walby et al. |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

3GPP TS 21.133 v4.1.0, "3rd Generation Partnership Project; Technical Specification Group Service and System Aspects; 3G Security; Security Threats and Requirements," Release 4, (Dec. 2001), 26 pages.

3GPP TR 33.801 v1.0.0, "3rd Generation Partnership Project; Technical Specification Group Service and System Aspects; Access Security Review," Release 7, (Nov. 2005), 41 pages.

3GPP TR 33.821 v9.0.0, "3rd Generation Partnership Project; Technical Specification Group Service and System Aspects; Rationale and track of security decisions in Long Term Evolved (LTE) RAN/3GPP System Architecture Evolution (SAE)," Release 9, (Jun. 2009), 141 pages.

Ahmadian, Zahra, et al., "New Attacks on UMTS Network Access," IEEE, 2009, 6 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

Girardin, F., et al., "Detecting air travel to survey passengers on a worldwide scale," Journal of Location Based Services, 2010, 26 pages.

Kostrzewa, A., "Development of a man in the middle attack on the GSM Um-Interface," Master Thesis, 2011, 88 pages.

Meyer, U., et al., "On the Impact of GSM Encryption and Man-in-the-Middle Attacks on the Security of Interoperating GSM/UMTS Networks," proceedings of the $15^{th}$ IEEE International Symposium on Personal, Indoor and Mobile Radio Communications, 2004, pp. 2876-2883.

Strobel, D., "IMSI Catcher," Seminararbeit, Ruhr-Universität Bochum, 2007, pp. 13-24.

Vedaldi, A., "An implementation of SIFT detector and descriptor," University of California at Los Angeles, 2007, 7 pages.

European Search Report, dated Sep. 18, 2013, received in connection with EP Patent Application No. 13165913.8.

\* cited by examiner

SYSTEMS AND METHODS FOR IDENTIFYING ROGUE BASE STATIONS

CROSS-REFERENCE TO RELATED APPLICATIONS

This application is a continuation of U.S. patent application Ser. No. 13/874,332, filed on Apr. 30, 2013, and claims foreign priority to Israel Patent Application Number IL 219500 filed on Apr. 30, 2012. These applications are hereby incorporated by reference in their entirety.

FIELD OF THE DISCLOSURE

The present disclosure relates generally to communication monitoring, and particularly to systems and methods for identifying rogue base stations.

BACKGROUND OF THE DISCLOSURE

Methods for eavesdropping and tracking mobile phones and other mobile devices are known in the art. For example, eavesdropping devices, which force a mobile phone to transmit the International Mobile Subscriber Identifier (IMSI), are sometimes referred to as "IMSI catchers." Examples of IMSI catching techniques are described, for example, by Strobel in "IMSI Catcher," Jul. 13, 2007, by Asokan et al., in "Man-in-the-Middle Attacks in Tunneled Authentication protocols," the 2003 Security Protocols Workshop, Cambridge, UK, Apr. 2-4, 2003, and by Meyer and Wetzel in "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, Barcelona, Spain, Sep. 5-8, 2004, pages 2876-2883, which are all incorporated herein by reference.

The communication between GSM mobile terminals and base transceiver stations (BTS) is encrypted using GSM encryption algorithms (A5/1, A5/2), which are described, for example, in "Instant Ciphertext-only Cryptanalysis of GSM Encrypted Communications," Advances in Cryptology, Proceedings of Crypto 2003, Lecture Notes in Computer Science 2729, Springer-Verlag, 2003, pages 600-616, which is incorporated herein by reference.

Recently, tools for creating IMSI catchers and deciphering these encryption algorithms were made public, for example within the open source projects of Open Source Mobile Communication Base Band (OsmocomBB), or Open Source GSM Baseband project. As a result, criminals and hackers can now overcome this encryption protection using commercially available hardware, in combination with rogue base stations, to create complete eavesdropping solutions and spoof innocent subscriber identities for their own purposes. The Open Source Mobile Communication Base Band (OsmocomBB), or Open Source GSM Baseband project, supports free software that can be uploaded to a mobile phone. The program configures a cellular phone to detect and report to the subscriber when the phone is being tracked by an IMSI catcher.

SUMMARY OF THE DISCLOSURE

An embodiment that is described herein provides a method including receiving air interface transmissions from multiple base stations belonging to a wireless communication network, and from one or more rogue base stations that do not belong to the network and are used for monitoring of communication terminals communicating in the network. One or more of the received transmissions are identified as suspicious by applying a criterion to the received transmissions. One or more of the rogue base stations are identified based on the transmissions identified as suspicious.

In some embodiments, receiving the air interface transmissions includes receiving one or more of the transmissions from one or more mobile communication terminals. In an embodiment, applying the criterion includes detecting that one or more of the transmissions cause one or more of the communication terminals to reveal respective terminal identifiers. In another embodiment, applying the criterion includes detecting that one or more of the transmissions cause one or more of the communication terminals to increase their respective frequency of transmission.

In a disclosed embodiment, applying the criterion includes detecting that a base station aborts a call setup process with a communication terminal before completion of the call setup process. In another embodiment, applying the criterion includes applying the criterion to two or more of the transmissions that are addressed to multiple different ones of the communication terminals. Applying the criterion may include detecting a transmission from previously-unknown base station identifier.

In yet another embodiment, applying the criterion includes detecting broadcast channels that are transmitted from a given base station identifier at a rate that is higher than that of other base stations in an area of the given base station identifier. In still another embodiment, applying the criterion includes detecting a same Temporary Mobile Subscriber Identity (TMSI) transmitted in communication with two or more of the base stations.

Applying the criterion may include detecting that the same TMSI is in communication with a first base station using a first encryption algorithm, and with a second base station using a second encryption algorithm that is weaker than the first encryption algorithm, and identifying the rogue base station may include indicating the second base station as rogue.

In some embodiments, applying the criterion includes detecting that a rate of rejection of the communication terminals by a base station exceeds a predefined threshold. In an embodiment, applying the criterion includes detecting that a given base station requests one or more of the communication terminals to encrypt the transmissions with a first encryption algorithm that is stronger than a second encryption algorithm requested by other base stations. In another embodiment, applying the criterion includes detecting that a base station instructs a change in a cipher mode of one or more of the communication terminals a number of times exceeding a predefined threshold.

In yet another embodiment, applying the criterion includes detecting a base station not transmitting information about neighboring base transceiver stations. In an embodiment, applying the criterion includes detecting a base station that enforces a cell reselection offset exceeding a predefined threshold. In an embodiment, the method includes counting a number of the base stations in a geographical region, and assigning a weight to the cell reselection offset based on the number.

Additionally or alternatively, applying the criterion may include detecting a change in a location area code (LAC) identifier of a given base station. Applying the criterion may include detecting a base station requesting one or more of the mobile communication terminals to transmit the International Mobile Equipment Identifier (IMEI) a number of times exceeding a predefined threshold.

In some embodiments, applying the criterion includes detecting a base station that requests re-registration of one or more of the communication terminals with the network at a rate above a predefined time interval. In an example embodiment, applying the criterion includes detecting a base station that requests one or more of the communication terminals to resend an International Mobile Subscriber Identity (IMSI) at every location update. In an embodiment, applying the criterion includes detecting a base station that sends short message service (SMS) silent messages to one or more of the communication terminals at a rate that is above a predefined value.

In another embodiment, applying the criterion includes detecting a base station that pages one or more of the communication terminals without subsequently assigning respective traffic channels to the one or more of the communication terminals. Additionally or alternatively, applying the criterion may include detecting a base station that assigns one or more of the communication terminals respective traffic channels without subsequently entering a call control state, transmitting text messages or transmitting a call setup message within a predefined time interval.

Further additionally or alternatively, applying the criterion may include detecting a base station that requests one or more of the communication terminals to transmit at maximum power. In an embodiment, applying the criterion includes detecting a base station that ends a call with a communication terminal without disconnecting the communication terminal from a traffic channel used for the call.

In some embodiments, applying the criterion includes applying a statistical analysis to the received transmissions. Applying the statistical analysis may include counting a number of occurrences of the transmissions identified as suspicious, and applying a threshold to the counted number. Additionally or alternatively, applying the statistical analysis may include applying an Artificial Intelligence process to the received transmissions.

There is additionally provided, in accordance with an embodiment that is described herein, apparatus including a receiver and a processor. The receiver is configured to receive air interface transmissions from multiple base stations belonging to a wireless communication network, and from one or more rogue base stations that do not belong to the network and are used for monitoring of communication terminals communicating in the network. The processor is configured to identify one or more of the rogue base stations by applying a criterion to the received transmissions.

The present disclosure will be more fully understood from the following detailed description of the embodiments thereof, taken together with the drawings in which:

DETAILED DESCRIPTION OF EMBODIMENTS

Overview

Figure 1:
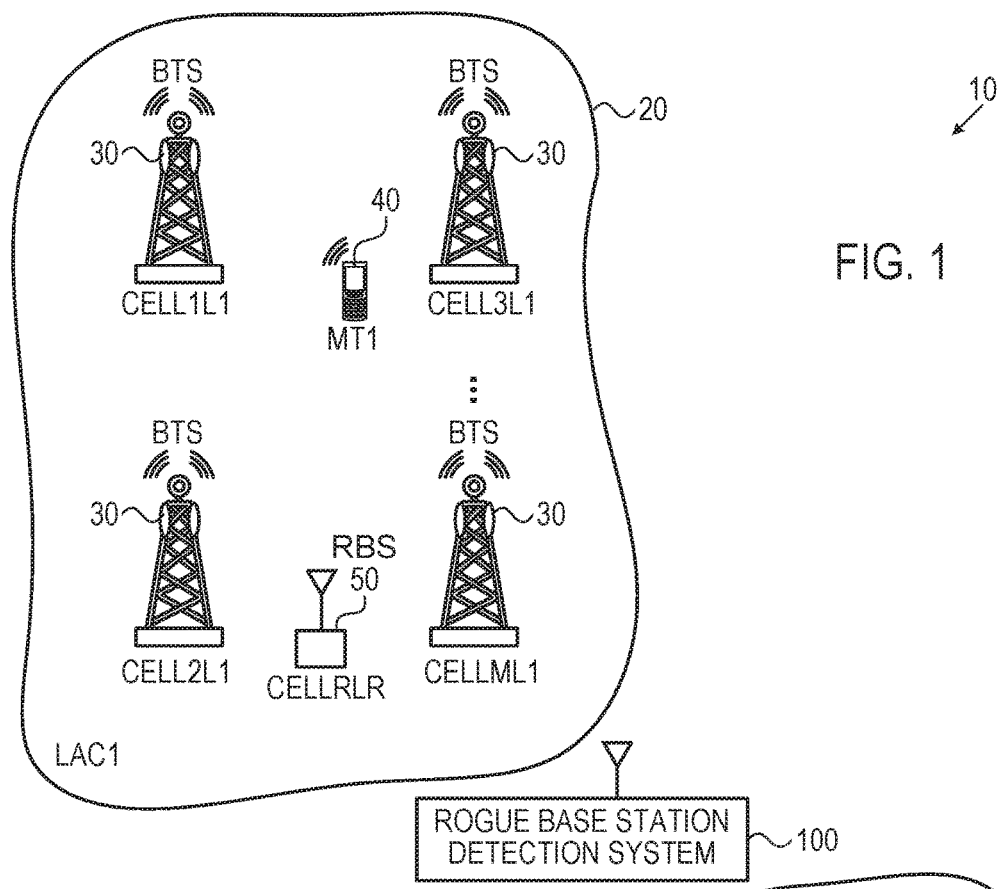
FIG. 1 is a block diagram that schematically illustrates a wireless communication network, in accordance with an embodiment that is described herein.
Figure 1:
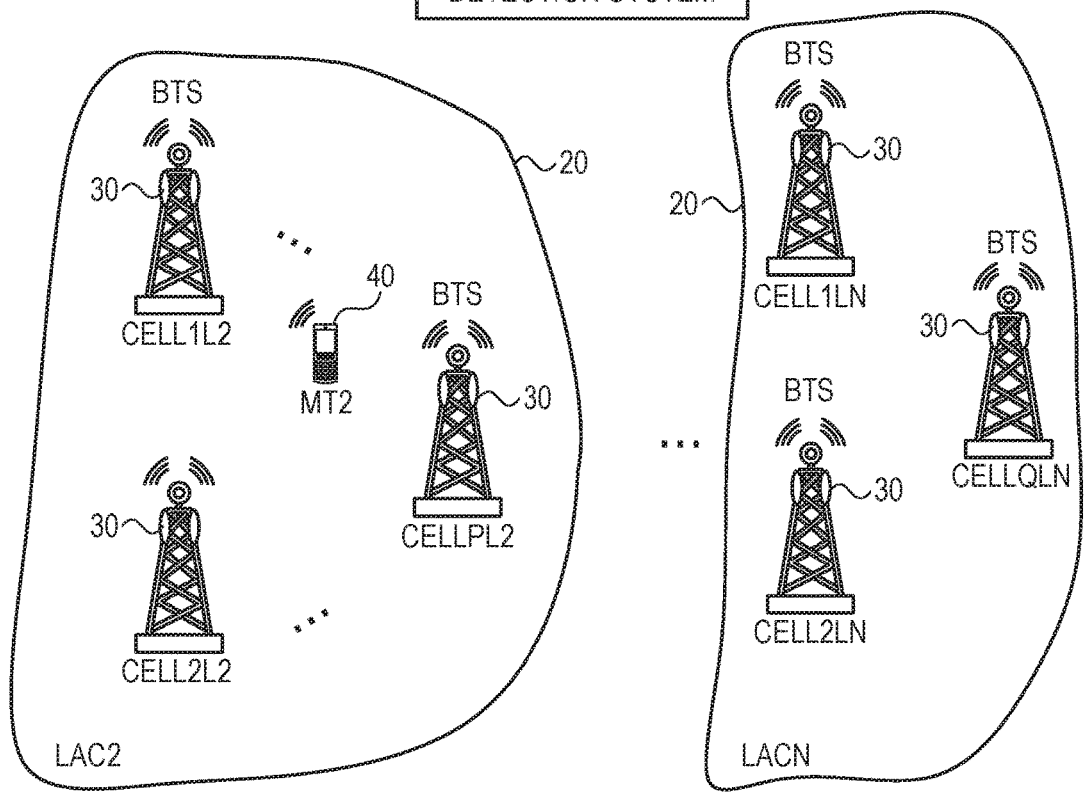

Embodiments that are described herein provide methods and systems for identifying one or more rogue devices within a wireless communication network over a particular geographic location. Tracking and eavesdropping of mobile communication terminals by rogue base stations can be used, for example, by criminals and hackers to invade the privacy of the subscribers of mobile service providers or to commit fraud by generating calls and other communication at the expense of innocent subscribers.

Thus, capabilities for detecting and identifying the presence of such rogue base station is important, for example, in order for mobile service providers to protect the privacy of their subscribers, to prevent fraud, to comply with local regulations, and to maintain a well-behaved network.

In some embodiments, a rogue base station detection system receives air interface transmissions from base stations belonging to a wireless communication network, as well as from one or more rogue base stations that do not belong to the network and are used for monitoring (e.g., hacking or eavesdropping) communication terminals communicating in the network. The system is typically passive, i.e., comprises its own antenna and receiver that monitors the bandwidth used by the network in question so as to monitor base station transmissions off the air.

The system typically searches for signaling channels (e.g., broadcast/common channels and/or channels dedicated to communicate with specific terminals) and converts the RF signal into GSM/UMTS messages including overcoming the different encryption methods used. The system than analyzes the received transmissions so as to identify suspicious transmissions that may be transmitted by the rogue base stations. If a rogue base station is identified, an alert is issued.

Various criteria for distinguishing between suspicious transmissions of rogue base stations and transmissions of genuine legitimate base stations are described herein. Typically, the system applies statistical analysis or machine learning to the evaluated criteria, in order to increase the confidence of rogue base station detection and avoid false detections. In many cases, the criteria can be met occasionally by genuine base stations, and distinction between genuine and rogue base stations is based on the statistical significance or statistical confidence of meeting the criteria. For example, the system may compare the rate of meeting a criterion by different base station, and identify base stations for which the rate deviates from a certain range.

The disclosed techniques are highly effective in identifying the presence of IMSI catchers and other rogue base stations. It may be possible in principle to implement rogue base station detection functionality within a given mobile terminal, in order to alert the terminal to the fact it is being tracked. This sort of solution, however, is limited in performance since it is able to analyze only the base station transmissions that are addressed to the given terminal. The disclosed techniques, by contrast, are typically applied to base station transmissions addressed to multiple mobile terminals, and can therefore achieve superior detection performance.

The rogue base station detection system described herein can cover a wide geographic area, and does not depend on software installation on a mobile communication terminal. Moreover, since the rogue base station is not part of the service provider's network, communication with the rogue base station cannot be detected or analyzed by monitoring the internal interfaces of the network, e.g., interfaces between switches. Thus, detection of rogue base stations would be very limited without monitoring over-the-air transmissions within the geographic area of interest as described in the embodiments that are described herein.

System Description

FIG. 1 is a block diagram that schematically illustrates a wireless communication network 10, in accordance with an embodiment that is described herein. Network 10 comprises multiple Base transceiver stations (BTS) 30 that communicate with mobile terminals (MT) 40. Network 10 may operate in accordance with any suitable communication protocol or standard, such as, for example, Global System for Mobile communications (GSM) or Universal Mobile Telecommunications System (UMTS). Terminals 40 may comprise, for example, cellular phones, wireless-enabled computing devices, or any other suitable type of communication terminal.

Network 10 comprises N geographic regions 20 or geographical areas of interest that are covered by the network. Each BTS 30 is assigned a unique BTS identifier (referred to as CELLid). Each base transceiver station within a Location Area Code (LAC) region is identified by a LAC identifier and a unique CELLid number. For example, CELL1L1 refers to CELLid=1 in LAC1. LAC1 comprises M base transceiver stations denoted CELL1L1, CELL2L-1, . . . CELLML1, LAC2 comprises P base transceiver stations denoted CELL1L2, CELL2L2, . . . CELLPL2, and LACN comprises Q base transceiver stations denoted CELL1LN, CELL2LN, . . . CELLQLN. (The CELLid numbers are typically unique across the entire network 10, not only within a specific LAC.) Each LAC may comprise any suitable number of BTSs, sometimes a large number of BTSs per LAC.

When a mobile communication terminal (MT) 40 enters a LAC region such as the two mobile communication terminals denoted MT1 and MT2 in LAC1 and LAC2, respectively, as shown in FIG. 1, the mobile communication terminals start to communicate with one or more of the surrounding base transceiver stations located in the particular LAC region. Initially, mobile communication terminal 40 upon being switched on or moving into a LAC region for the first time may be required to perform registration with the wireless communication network by first transmitting identifiers, such as the International Mobile Subscriber Identity (IMSI) number of the MT to the network.

Typically, the IMSI number is transmitted relatively rarely. Thus, once the IMSI number is initially transmitted and the subscription validated, the MT is configured to further communicate with the network through the use of a Temporary Mobile Subscriber Identity (TMSI) number that is assigned to the mobile communication terminal by the network.

In the embodiment described here, the mobile communication terminal determines which BTS provides the most optimal communication. For example, MT1 may select BTS identified by CELL3L1 as the "selected BTS" to communicate with. MT1 then registers with the selected BTS and this registration data is forwarded to the visitor location register (VLR) of the network. MT1 may switch to another BTS within the same LAC without notifying the network until such time as MT1 requests a desired service like sending an SMS or establishing a call. As a result, when there is an incoming call, each BTS in the LAC region, in which mobile communication terminal last registered, starts paging the mobile communication terminal and then the MT will respond to the BTS that has the best signal.

As mobile communication terminal MT1 moves within the LAC1 region, the network sends a location update request requiring MT1 to transmit the TSMI to the network periodically. If, for example, MT1 moves in LAC1 region far enough away from the currently-selected BTS with CELL3L1 and closer to BTS with CELL1L2 that belongs to another LAC, then MT1 may reselect the BTS with CELL1L1 as the newly-selected BTS for communication and perform a new registration update procedure.

When the network is required to establish a call or send a text message (SMS) to MT1, a paging signal is sent to MT1. MT1 then replies to the paging signal and the currently-selected BTS of MT1 then assigns a frequency channel for communication between MT1 and the currently-selected BTS. If MT1 does not reply, the subscriber with MT1 is marked as absent in the network registry until such time as MT1 replies to the paging signal. Once MT1 communicates with a BTS, a cipher mode is implemented to encrypt the communication to further ensure better privacy and security for the subscriber.

Illegitimate Tracking of Mobile Terminals Using Rogue Base Stations

The communication between mobile communication terminals 40 and base transceiver stations 30 as described above can be monitored illegitimately, e.g., by criminals and terrorist groups, by utilizing one or more rogue base stations 50, which can be placed within the geographic regions 20. Rogue base station 50 is typically configured to communicate with mobile devices while posing as a valid BTS, and causing the mobile communication terminal to reveal its identifiers, such as the International Mobile Subscriber Identifier (IMSI) number and the International Mobile Equipment Identifier (IMEI) number.

The rogue base station can also force the MT to transmit at the highest possible power levels to assist in tracking the MT within geographic regions 20. Additionally or alternatively, the rogue base station can apply various measures that stimulate the terminal to transmit, in order to track it. The rogue base station can also intercept the call content and perform various other tracking-related functions.

In some scenarios, the rogue base station reuses transmission parameters of a nearby BTS 30, such as the LAC or CELLid of the BTS. In other scenarios, the rogue base station connects to the victim MT, and extracts the identifiers of the victim MT. The rogue base station subsequently uses the extracted identifiers to connect to a legitimate BTS posing as the victim MT using identifiers (IMSI, TMSI, and encryption keys (Kc)) assigned to the victim MT by the BTS. The rogue base station can then generate calls or SMS messages on behalf of the victim, while eavesdropping on the call content. In accordance with some embodiments, a rogue base station detection system 100 is implemented to identify one or more rogue base stations in a geographical region in order to circumvent these security breaches as described above in the wireless communication network, as shown in FIG. 1. In some embodiments, detection system 100 can be implemented in a portable enclosure that can be placed in any location within network 10. Alternatively, system 100 can be implemented in any other suitable manner.

Network 10 comprising a combination of geographic regions 20 defined by LAC1, LAC2, . . . LACN, M, P, and Q base transceiver stations, mobile communication terminals MT1 and MT2, rogue base station 50, and rogue base station detection system 100, as shown in FIG. 1, is merely for conceptual clarity, and not by way of limitation of the embodiments whatsoever.

Figure 2:
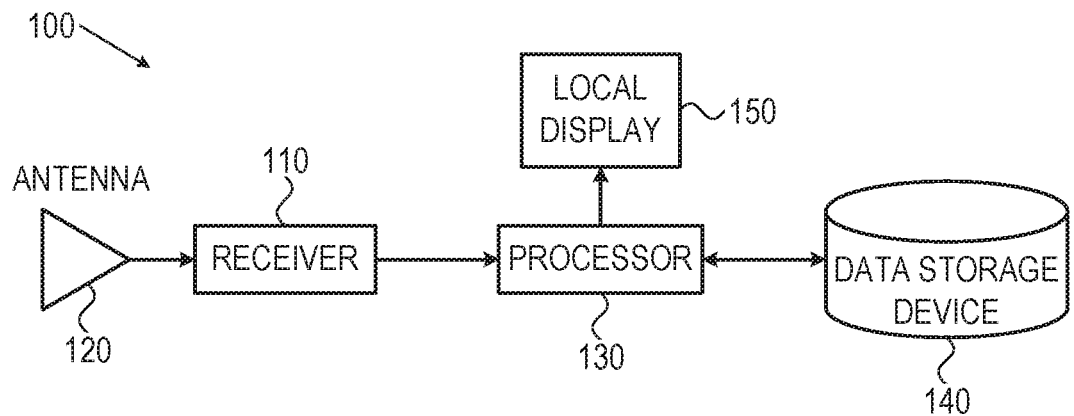
FIG. 2 is a block diagram that schematically illustrates a rogue base station detection system, in accordance with an embodiment that is described herein.

FIG. 2 is a block diagram that schematically illustrates rogue base station detection system 100, in accordance with an embodiment that is described herein. Detection system 100 comprises a receiver 110 with antenna 120, which receives air interface transmissions from base transceiver stations 30 and rogue base stations 50, and relays the received transmissions to a processor 130. In some embodiments, receiver 110 also receives transmissions from one or more mobile terminals and relays them to the processor, as well.

The processor then stores the data in a data storage device 140. Detection system 100 notifies an operator of a detected rogue base station in the region of interest on the output of a local display 150. Additionally or alternatively, system 100 may transmit such a notification to a remote monitoring center.

The configuration of system 100 shown in FIG. 2 is an example configuration, which is chosen purely for the sake of conceptual clarity. In alternative embodiments, any other suitable configuration of system 100 can be used. Some elements of system 100 may be implemented in hardware, e.g., in one or more Application-Specific Integrated Circuits (ASICs) or Field-Programmable Gate Arrays (FPGAs). Additionally or alternatively, some elements of system 100, such as processor 130, can be implemented using software, or using a combination of hardware and software elements. Storage device 140 may be implemented using any suitable type of memory, such as magnetic or solid-state memory.

Some of the functions of system 100, such as the functions of processor 130, may be carried out using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Methods for Identifying Rogue Base Stations

Figure 3:
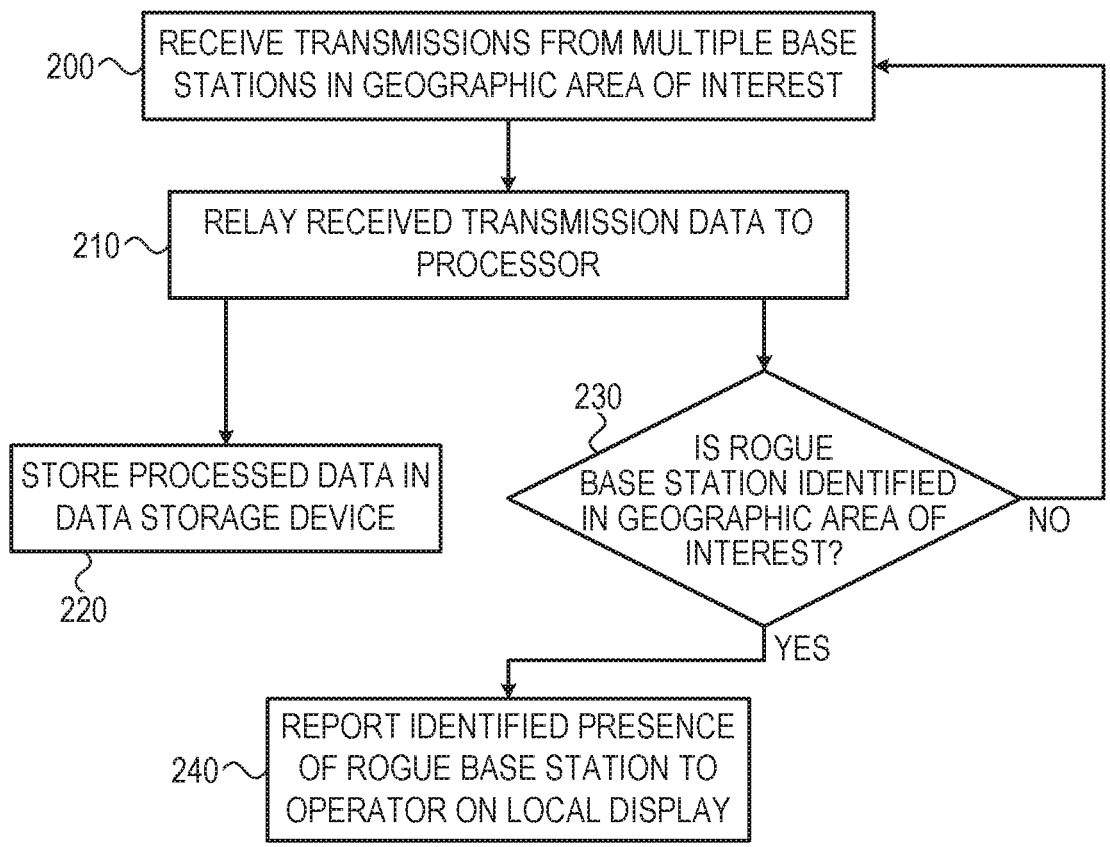
FIG. 3 is a flow chart that schematically illustrates a method for identifying a rogue base station, in accordance with an embodiment that is described herein.

FIG. 3 is a flow chart that schematically illustrates a method for identifying a rogue base station, in accordance with embodiments that are described herein. In a receive step 200, receiver 110 of rogue base station detection system 100 receives air interface transmissions from multiple base stations in the geographical area of interest, and possibly also from one or more mobile terminals. In a relaying step 210, the received transmission data is relayed to processor 130. In a storage step 220, processor 130 stores the processed data in data storage device 140.

Processor 130 is typically configured to identify one or more rogue base stations in a geographical area of interest by applying a criterion to the received transmissions. In a decision step 230, if one or more rogue base stations are identified by processor 130, the processor reports the identified presence of one or more rogue base stations to the operator on local display 150 in a reporting step 240. If no rogue base station is detected, detector 100 continues to receive transmissions in receive step 200.

System 100 is configured to apply a criterion to the received transmission data to identify the presence of one or more rogue base stations as will be described in the following embodiments. Generally, the criteria described below aim to distinguish between transmissions of rogue base stations 50 and those of legitimate base stations 30. In some embodiments, during decision step 230, processor 130 applies statistical analyses or machine learning processes to the pattern, repetition, and number of suspicious occurrences in which a mobile communication terminal is forced to reveal one or a combination of its identifiers so as to identify the one or more rogue base stations. The statistical analyses applied to the received transmissions by system 100 achieve a higher level of confidence in identifying that one or more base transceiver stations in a geographical region are rogue base stations.

Some criteria identify transmissions that are aimed at causing the terminal to reveal its identifiers, such as IMSI or IMEI. Other criteria are aimed at causing the terminal to increase the frequency of its transmissions, in order to enable its tracking (e.g., in order to enable a direction finder—DF—to measure the terminal location).

In normal network operation, the MT reveals the above-named identifiers to the BTS of the service provider only in the initial registration to the VLR, rouge base station usually asks for these identifiers from every (or most of) MT that registers to it for the purpose of identify MT of interest.

In some embodiments, if system 100 detects a new (previously unknown) BTS identifier (CELLid) in a given LAC region suggesting that a new base transceiver station suddenly appeared in the geographic region of interest, the BTS can be suspected of being a rogue base station (RBS).

In other embodiments, if system 100 detects a base transceiver station identifier that transmits a broadcast channel at a transmission rate that is twice the nominal rate of other BTSs in the same LAC or network the broadcast channel, some of these transmissions can be suspected of originating from an RBS. The rationale behind this criterion is that, when an RBS mimics the identifier of a legitimate BTS, half of the broadcast channels are transmitted from the legitimate BTS and half of the broadcast channels are transmitted from the RBS. Thus, twice the nominal rate of the broadcast channels is detected by system 100.

In yet other embodiments, if system 100 detects a BTS that rejects communication terminals at a high rate of rejection that exceeds a predefined threshold (e.g., 90% rate of rejection) or compared to the other BTS in the same LAC, this property may indicate that the BTS is not processing the communicated information, but just receiving MT identifiers. The BTS can be suspected of being an RBS.

The presence of an RBS in a geographic region of interest can be detected in the setup mode when the MT initially starts communicating with the rogue base station posing as a legitimate base transceiver station. In some embodiments, if system 100 detects that while most mobile communication terminals in the network are encrypting the communication using strong encryption algorithms (e.g., A5/1), a specific BTS instructs the mobile communication terminals to use weaker encryption algorithms (e.g., A5/2 or A5/0). Such a BTS can be suspected of being an RBS intercepting call content.

In other embodiments, if system 100 detects that a BTS requests a change in the cipher mode (e.g., to encrypt or stop encrypting the communication) of one or more mobile communication terminals a number of times exceeding a predefined threshold (e.g. more than twice), the BTS may be suspected of being a rogue base station intercepting the communication. Receiving more than four requests to change cipher mode indicates a very high probability that the MT is under surveillance by an RBS.

In other embodiments, system 100 can detect that a specific MT is communicating with the one BTS with low encryption (e.g. A5/2) while at the same time it is communicating with another BTS with stronger encryption (e.g. A5/1 or A5/3), in this scenario the system can deduct that the first BTS is a RBS and that the second BTS belongs to the service provider network.

A legitimate BTS typically transmits messages to mobile communication terminals in the region with information about neighboring base transceiver stations in the same region for the purpose of reselecting a new selected BTS if the communication quality is degraded with the current-selected BTS. In some embodiments, if system 100 detects that a particular BTS is not transmitting information about neighboring base transceiver stations, this BTS can be suspected of being an RBS.

A mobile communication terminal (MT) is associated with a selected BTS at any given time. When transmissions from another BTS are received by the MT with a stronger signal strength than the currently-selected BTS, the MT can synchronize and assign the latter BTS as the reselected BTS. The reselection decision is typically based on parameters such as transmit power, channel quality, and a cell reselection offset. The cell reselection offset (CRO) is typically set by the network for a particular BTS based on network traffic conditions to be more attractive for the MT to select that particular BTS.

In some embodiments, if system 100 detects a BTS that enforces a CRO that is higher than a predefined threshold (e.g., >80 dB), this BTS may be suspected as being an RBS. The rationale behind this criterion, which is more relevant to urban areas, is that an RBS may select the CRO to be >80 dB, i.e., effectively infinite, such that the hacked MT will remain synchronized with the RBS.

In rural areas having fewer base transceiver stations, this criterion may be less relevant, in that each BTS is normally configured to operate with a high CRO. In some embodiments, system 100 is configured to count the number of base transceiver stations within a geographical monitored region. System 100 then assigns a weight to the CRO parameter based on the number of base transceiver stations. A particular BTS may be a rogue base station if system 100 detects that the weighted CRO exceeds a predetermined threshold.

In wireless communication system 10, a LAC region comprises a fixed LAC number identifier as explained previously. Each base transceiver station within the LAC region is identified by network 10 by a fixed LAC number and its unique CELLid number. In other words, each CELLid is associated with a particular LAC to which the BTS belongs.

In some embodiments, if system 100 detects that the LAC number of a given CELLid changes, the CELLid having the new LAC may be suspected of being a rogue base station. The rationale behind this criterion is that such an event may be caused by a rogue base station that mimics the CELLid of a legitimate BTS, but not its LAC (in order to force the terminals in its area to perform a registration procedure to the new LAC). Thus, in some embodiments, if system 100 detects a mismatch between receiving a first LAC identifier known to a particular BTS from previous transmissions, and receiving a second LAC identifier from the same BTS in a later transmission, the BTS may be suspected of being an RBS.

The prior association between CELLids and LAC numbers may become known to system 100 in various ways, for example, by monitoring network 10 for a certain time period and establishing the CELLids and LACs of the legitimate BTSs, or by using information obtained from the cellular service provider. The associations between CELLids and LACs can be stored, for example, in storage device 140.

Network 10 typically requests the IMEI number of the mobile communication terminal on the first connection of the terminal with the network. In some embodiments, if system 100 detects that a BTS requests one or more mobile communication terminals to transmit the IMEI a number of times exceeding a predefined threshold (e.g., more than once) after the first communication by the MT with the network, that BTS can be suspected as being a rogue base station.

When the mobile communication terminal registers with the network, the MT transmits identifiers, such as the IMSI and IMEI. After registration, the network can periodically transmit a reregistration request to the MT through the selected BTS. In some embodiments, if system 100 detects that a BTS requests re-registration at a rate above a pre-defined time interval (e.g., <30 min), the BTS can be suspected as being a rogue base station. The rationale behind this criterion is that rapid successive re-registration requests to force the MT to reveal its identifiers in the short intervals suggest that the BTS may be a rogue base station tracking the mobile communication terminal.

In other embodiments, if system 100 detects that the BTS requests one or more of the mobile communication terminals to resend the IMSI instead of the TMSI at every location update, the BTS can be suspected as a rogue base station. The rationale behind this criterion is that the TSMI is purposely assigned by the network for the MT in order to minimize the need by the MT to resend the IMSI.

In yet another embodiment, if system 100 detects that the same TMSI is transmitted in communication with two or more different base transceiver stations in a predefined interval, at least one of these BTSs can be suspected as a rogue base station. The rationale being that a rogue base station has intercepted the TMSI of a mobile communication terminal in the same region and is using the intercepted TMSI posing as the legitimate MT to communicate with a BTS. This is a very strong indication that a rogue base station is present within the region of interest. In one example embodiment, system 100 may detect that the same TMSI communicates with different base stations using different encryption algorithms. In such a case, the system may indicate the base station using the weaker encryption is likely to be rogue.

A Type 0 short message service (SMS), also known as 'Silent SMS' message, is an administrative feature that can be used, for example, by the mobile provider to send information to the mobile communication terminal. The SMS is transparent to the user such that the SMS will not show up on the display of the MT, nor will the user of the MT hear a beep tone. Silent SMS messages can also be used for illegitimate purposes, such as for tracking the terminal. In some embodiments, if system 100 detects that a BTS is sending frequent silent SMS messages to one or more mobile communication terminals (e.g., at a rate that is above some predefined value), the BTS may be suspected as a rogue base station. The rationale here is that a rogue BTS may transmit silent SMS messages in order to cause the terminals to reply with an acknowledgement, thereby enabling their tracking.

In some embodiments, a BTS may be suspected of being a rogue base station if it exhibits a high rate of beginning call setup processes with terminals but then aborts the process before completion. Events of this sort may be indicative of a rogue base station that solicits terminals to transmit and communicate.

For example, if system 100 detects that one or more of the mobile communication terminals were paged, but the BTS did not follow with assigning a traffic channel to the terminal, the BTS may be a rogue base station tracking the mobile communication terminal. The first step in the mobile communication terminal receiving a call is paging. The wireless communication network maintains in the network registry the LAC region where an MT responded to the last location update request. All of the base transceiver stations within that LAC region start transmitting a paging message. A mobile communication terminal is typically configured to identify paging message from the selected BTS. A rogue base station may mimic the selected BTS and send successive paging messages to the MT to force it to respond so as to locate the MT. Moreover, if a BTS does not continue transactions after paging, such as to assign a traffic channel, the BTS may be suspected of being an RBS.

As another example, if system 100 detects that one or more of the mobile communication terminals are assigned a traffic channel by the BTS but do not enter a call control state, or do not receive a text message within a predefined time interval (e.g., 2 seconds), the BTS may be a rogue base station tracking the mobile communication terminal. If an MT does not enter a call control state in 10 seconds, the probability is very high that the user is being tracked. In other embodiments, if system 100 detects that one or more of the mobile communication terminals communicate on a traffic channel, but do not receive a call setup message within a predefined time interval (e.g., 2 seconds), the BTS may be a rogue base station tracking the mobile communication terminal. If the MT does not receive a call setup message in 10 seconds, there is a very high probability that the user is being tracked.

Yet in other embodiments, if system 100 detects that a BTS requests that one or more of the mobile communication terminals transmit at the highest possible power, the BTS may be a rogue base station tracking the mobile communication terminal. The rationale behind this criterion is that although there is a possibility that the MT could be located at the furthest distance from the selected BTS forcing transmission at maximum power, an RBS may also be requesting the MT to transmit at maximum power for tracking purposes.

In some embodiments, if system 100 detects that at the end of a call, the BTS does not disconnect the MT from the traffic channel, the BTS may be a rogue base station intercepting the call. The rationale behind this criterion is that the user thinks that the call was terminated, but the MT still operates on an open channel like a microphone, where a hacker can listen to the activities around the location of the MT.

The rogue base station detection criteria described herein are shown purely by way of example. In alternative embodiments, system 100 may use any other suitable criterion that distinguishes between transmissions of rogue base stations and transmissions of legitimate base stations.

Typically, system 100 will use a combination of multiple criteria in order to increase the confidence of rogue base station detection and reduce the probability of false detection. In some cases, a single event that meets a certain detection criterion may not provide sufficient confidence to regard the BTS in question as rogue. Thus, in some embodiments system 100 evaluates multiple criteria for a given BTS, so as to increase the confidence.

Moreover, for a given BTS under evaluation, system 100 typically applies the detection criteria to transmissions addressed to multiple different terminals 40. This feature enables system 100 to better assess whether the BTS in question is a legitimate or a rogue BTS. System 100 is typically passive, i.e., it does not transmit or otherwise affect the communication of network 10. As such, its activity or presence cannot be detected by the operators of the Rouge Base Station.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for identifying a rogue base station in a wireless communication network, the method comprising:
   receiving air interface transmissions from base stations communicating with mobile terminals in the wireless communication network;
   detecting suspicious transmissions from the base stations, wherein the suspicious transmissions comprise transmissions instructing one or more of the mobile terminals to transmit at maximum power;
   comparing rates of suspicious transmission from the base stations to a threshold; and
   identifying a particular base station as the rogue base station based on the comparison of the rates being above the threshold.

2. The method according to claim 1, wherein the suspicious transmissions further comprise transmissions causing the one or more of the mobile terminals to reveal respective terminal identifiers.

3. The method according to claim 1, wherein the suspicious transmissions further comprise transmissions causing the one or more of the mobile terminals to increase their respective frequency of transmission.

4. The method according to claim 1, wherein the suspicious transmissions further comprise transmissions causing a change in a cipher mode of the one or more of the mobile terminals.

5. The method according to claim 1, wherein the suspicious transmissions further comprise transmissions causing a cell reselection offset exceeding a predefined threshold.

6. The method according to claim 1, wherein the suspicious transmissions further comprise transmissions requesting the one or more of the mobile terminals to transmit an International Mobile Equipment Identifier (IMEI).

7. The method according to claim 1, wherein the suspicious transmissions further comprise transmissions causing re-registration of the one or more of the mobile terminals with the wireless communication network.

8. A system for identifying a rogue base station in a wireless communication network, the system comprising:
- a receiver that receives air interface transmissions from base stations communicating with mobile terminals in the wireless communication network; and
- a processor communicatively coupled to the receiver and executing software instructions stored in a data storage device, wherein the software instructions cause the processor to:
- detect suspicious transmissions from the base stations, wherein the suspicious transmissions comprise transmissions instructing one or more of the mobile terminals to transmit at maximum power,
- compare rates of suspicious transmissions from the base stations to a threshold, and
- identify a particular base station as the rogue base station based on the comparison of the rates being above the threshold.

9. The system according to claim 8, wherein the suspicious transmissions further comprise transmissions causing the one or more of the mobile terminals to reveal respective terminal identifiers.

10. The system according to claim 8, wherein the suspicious transmissions further comprise transmissions causing the one or more of the mobile terminals to increase their respective frequency of transmission.

11. The system according to claim 8, wherein the suspicious transmissions further comprise transmissions causing a change in a cipher mode of the one or more of the mobile terminals.

12. The system according to claim 8, wherein the suspicious transmissions further comprise transmissions causing a cell reselection offset exceeding a predefined threshold.

13. The system according to claim 8, wherein the suspicious transmissions further comprise transmissions requesting the one or more of the mobile terminals to transmit an International Mobile Equipment Identifier (IMEI).

14. The method according to claim 8, wherein the suspicious transmissions further comprise transmissions causing re-registration of the one or more of the mobile terminals with the wireless communication network.

15. The system according to claim 8, further comprising a local display that is communicatively coupled to the processor and that displays a notification of the identified rogue base station.

16. A non-transitory storage medium containing software that when executed by a processor of a rogue base station detection system in a wireless communication network cause the rogue base station detection system to:
- receive air interface transmissions from base stations communicating with mobile terminals in the wireless communication network;
- detect suspicious transmissions from the base stations, wherein the suspicious transmissions comprise transmissions instructing one or more of the mobile terminals to transmit at maximum power;
- compare rates of suspicious transmission from the base stations to a threshold; and
- identify a particular base station as the rogue base station based on the comparison of the rates being above the threshold.

17. The non-transitory storage medium according to claim 16, wherein the processor of the rogue base station detection system is further configured by software to:
- display a notification of the identified rogue base station on a local display.

* * * * *